United States Patent
Unger

(10) Patent No.: US 11,740,034 B2
(45) Date of Patent: Aug. 29, 2023

(54) HEAT EXCHANGER ARRANGEMENT

(71) Applicant: MAHLE International GmbH, Stuttgart (DE)

(72) Inventor: Sascha Unger, Ludwigsburg (DE)

(73) Assignee: MAHLE International GmbH, Stuttgart (DE)

( * ) Notice: Subject to any disclaimer, the term of this patent is extended or adjusted under 35 U.S.C. 154(b) by 5 days.

(21) Appl. No.: 17/459,535

(22) Filed: Aug. 27, 2021

(65) Prior Publication Data

US 2022/0065558 A1 Mar. 3, 2022

(30) Foreign Application Priority Data

Aug. 27, 2020 (DE) .................. 10 2020 210 838.2

(51) Int. Cl.
*F28F 9/00* (2006.01)
(52) U.S. Cl.
CPC .................. *F28F 9/001* (2013.01)
(58) Field of Classification Search
CPC .......... F28F 9/001; F28F 9/0133; F28F 9/007; F28F 9/165; F28F 2009/004
USPC ........................................ 165/157
See application file for complete search history.

(56) References Cited

U.S. PATENT DOCUMENTS 6,622,808 B2 * 9/2003 Sasano ................ B29C 45/1676
180/68.6
2001/0027883 A1 10/2001 Sasano et al.
2002/0023735 A1 * 2/2002 Uchikawa ............... F28F 9/001
165/149
2020/0101817 A1 4/2020 Ohlhoff et al.

FOREIGN PATENT DOCUMENTS

| CN | 201857881 U | 6/2011 |
| CN | 103057384 A | 4/2013 |
| CN | 103335101 A | 10/2013 |
| CN | 110978993 A | 4/2020 |
| DE | 8421269 U1 | 10/1984 |
| DE | 102005036121 A1 | 2/2007 |
| DE | 102018124295 A1 | 4/2020 |
| GB | 2361461 A | 10/2001 |
| JP | 2001287667 A | 10/2001 |

* cited by examiner

*Primary Examiner* — Tho V Duong
*Assistant Examiner* — Raheena R Malik
(74) *Attorney, Agent, or Firm* — Muncy, Geissler, Olds & Lowe, P.C.

(57) ABSTRACT

A heat exchanger arrangement having at least a first heat exchanger and having a second heat exchanger, wherein the first heat exchanger has a first heat transfer matrix with a first air intake surface and with a first air outlet surface, and wherein the second heat exchanger has a second heat transfer matrix with a second air intake surface and with a second air outlet surface, wherein the first heat exchanger and the second heat exchanger are arranged adjacent to one another in such a manner that the first air outlet surface is opposite the second air intake surface and the two heat exchangers are arranged one behind the other in a primary direction of airflow, wherein at least one sealing strip is arranged on at least one lateral side region of the two heat exchangers or on both lateral side regions of the heat exchangers.

11 Claims, 2 Drawing Sheets

HEAT EXCHANGER ARRANGEMENT

This nonprovisional application claims priority under 35 U.S.C. § 119(a) to German Patent Application No. 10 2020 210 838.2, which was filed in Germany on Aug. 27, 2020, and which is herein incorporated by reference.

BACKGROUND OF THE INVENTION

Field of the Invention

The present invention relates to a heat exchanger arrangement, in particular for a motor vehicle.

Description of the Background Art

Heat exchangers are used in many ways in motor vehicles. In this context, heat exchanger arrangements with multiple heat exchangers are also known, which are arranged in the front end of a motor vehicle in a series arrangement. At higher driving speeds, the airflow flowing against the motor vehicle flows through heat exchangers in such an arrangement one after the other so that heat transfer takes place between the air and the fluid flowing through the heat exchanger in question. Since the airflow is high at high driving speeds, any side leakage airflow escaping between the heat exchangers causes little harm, even though only a reduced airflow is available to the subsequent heat exchanger as a result. If, in contrast, the fan is switched on at low driving speeds or when the motor vehicle is stationary, then it draws an airflow through the heat exchangers, in which case any side leakage airflows that flow past the heat exchangers are considered problematic, because the cooling is adversely reduced when there is reduced airflow.

A known use of foam strips for side sealing between the heat exchangers has the disadvantage that these foam strips degrade rapidly and no longer fulfill their purpose, and also that they can seal only inadequately.

SUMMARY OF THE INVENTION

It is therefore an object of the present invention to provide a heat exchanger arrangement that is improved over the prior art with regard to leakage airflows that are to be avoided, and is nevertheless economical and easy to manufacture.

An exemplary embodiment of the invention relates to a heat exchanger arrangement having at least a first heat exchanger and having a second heat exchanger, wherein the first heat exchanger has a first heat transfer matrix with a first air intake surface and with a first air outlet surface, and wherein the second heat exchanger has a second heat transfer matrix with a second air intake surface and with a second air outlet surface, wherein the first heat exchanger and the second heat exchanger are arranged adjacent to one another in such a manner that the first air outlet surface is opposite the second air intake surface and the two heat exchangers are arranged one behind the other in a primary direction of airflow, wherein at least one sealing strip is arranged on at least one lateral side region of the two heat exchangers or on both lateral side regions of the heat exchangers, which strip achieves a lateral sealing between the first heat exchanger and the second heat exchanger, wherein the sealing strip is an injection-molded sealing strip that has an injection-molded hard component on which a soft component is molded. As a result, a sealing strip can be produced and used that to the specific local relationships existing between the two heat exchangers in question, in order to achieve a secure and long-lasting optimum seal at low cost so that leakage airflows can be largely avoided. This achieves the result that the air drawn in by the fan is sufficient to achieve efficient heat transmission, and thus efficient cooling, especially at low driving speeds and under fan operation.

It is especially advantageous when at least one sealing strip is arranged on both lateral side regions of the two heat exchangers, which strip achieves a lateral sealing between the first heat exchanger and the second heat exchanger. In this way, sealing is achieved on both lateral sides of the heat exchangers, so that the air drawn in by the fan is sufficient to achieve efficient heat transmission, and thus efficient cooling, especially at low driving speeds and under fan operation.

It is also useful when the hard component is made of a thermoplastic material, for example of polyamide, polypropylene, etc. and/or the soft component is made of an elastomer, in particular of a thermoplastic elastomer. As a result, the hard component is essentially rigid in design so that it functions as a stiff and stable structure, while the soft component is soft and elastically flexible for placement against surfaces for secure sealing.

It is also advantageous for durability and stability when the hard component contains, in addition to the thermoplastic material, at least one additive, for example fibers, particles, spheres, rods, etc. that are made, for example, of glass, carbon, etc. As a result, higher strength can be achieved with the same volume or the volume of the hard component can be reduced.

It is also advantageous when the sealing strip has a bar that is made of the hard component, wherein the bar provides for the stability of the sealing strip and for the attachment of the sealing strip to the at least one heat exchanger. The bar in this case is arranged in the sealing strip in such a manner that it extends along a lateral side region of a heat exchanger and preferably is placed there in an attached manner.

It is also advantageous when an attachment is provided on the bar that are used for attachment of the sealing strip to the heat exchanger. Such attachment(s) in this design can be a latch, which permit easy and rapid installation. In this case, the latch can engage and latch with a header or in the tube/fin block of the heat exchanger, for example.

It is also advantageous when at least a first tab-like element made of the hard component is provided on the bar, which element projects from the bar and serves to hold the soft component. This preferably provides for the stable design of the seal and the stable support of the soft component so that the soft component does not inadvertently collapse and lose its sealing action.

It is also advantageous when at least a second tab-like element made of the soft component is provided on the bar, which element projects from the bar and, as appropriate, from at least one first tab-like element, and which is used for sealing. In this way, different regions that are to be sealed can advantageously be sealed independently of one another.

It is also advantageous when at least two second tab-like elements made of the soft component, which are spaced apart from another, are provided on the bar. In this way, different regions that are to be sealed can advantageously be sealed independently of one another, wherein a line, a pipe, a collecting box, a heat exchanger, etc. could also project between them.

In another advantageous exemplary embodiment, it is also useful when a recess is provided along the bar between two second tab-like elements for the passage of a heat exchanger, a pipe, a connecting flange, etc. In this way, as well, different regions that are to be sealed can advantageously be sealed independently of one another, wherein a line, a pipe, a collecting box, a heat exchanger, etc. could also project between them.

Additional advantageous embodiments are described by the following figure description and by the dependent claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
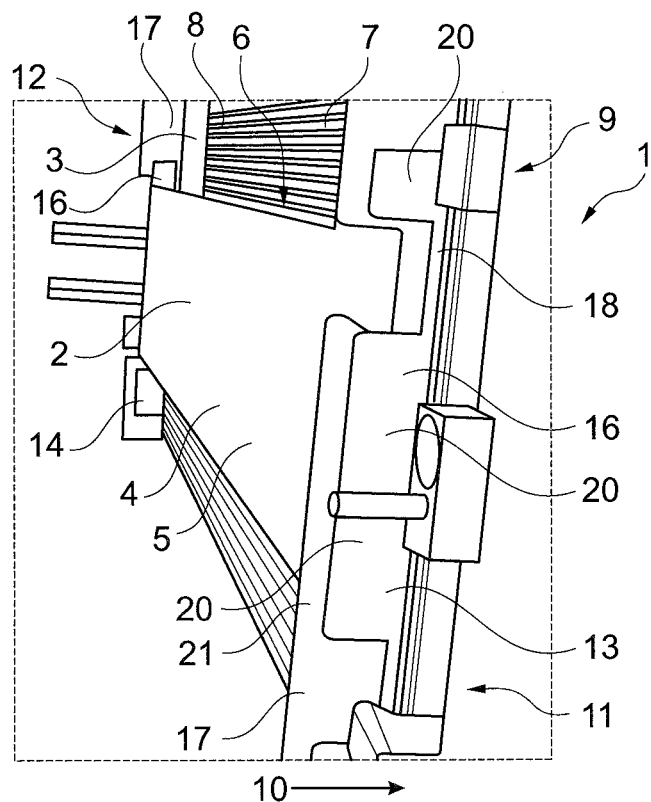
FIG. 1 is a schematic representation of two heat exchangers of a heat exchanger arrangement according to the invention with sealing strips according to the invention.

FIG. 1 shows, in a schematic representation, an exemplary embodiment of a heat exchanger arrangement 1 according to the invention, with only two heat exchangers 2, 3 of three heat exchangers being visible. In order to be able to show the invention more clearly, a third heat exchanger is not shown on the left next to the heat exchanger 2 in FIG. 1.

Figure 2:
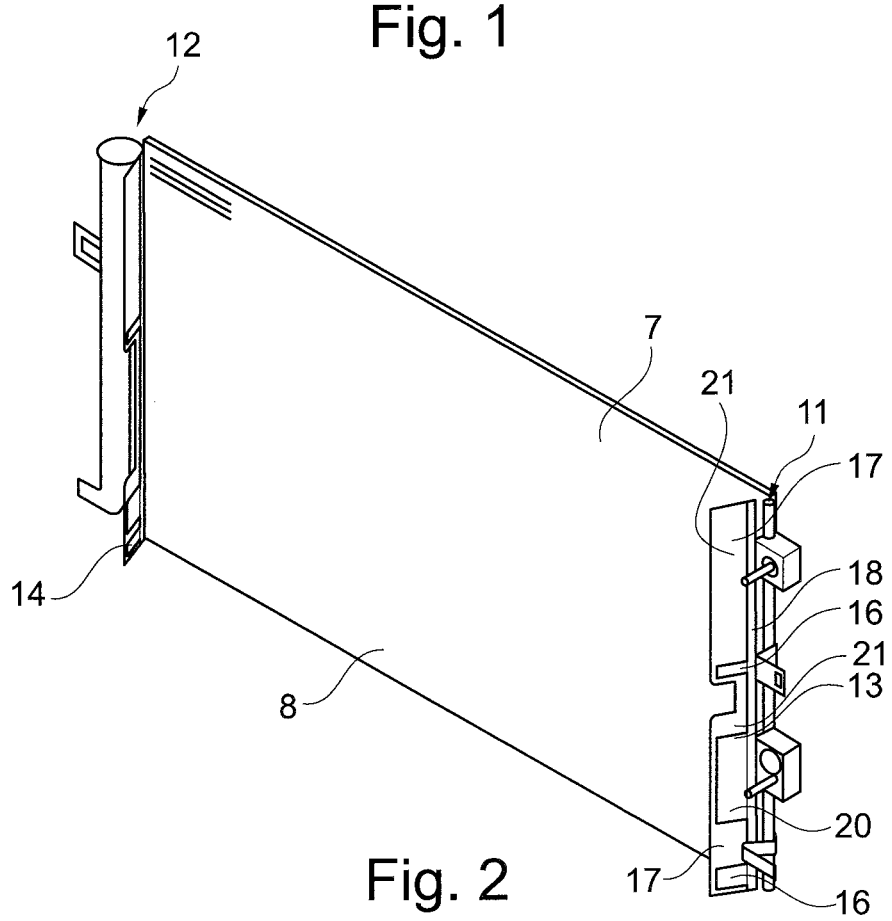
FIG. 2 is a schematic representation of a heat exchanger of a heat exchanger arrangement according to the invention with sealing strips according to the invention.

FIG. 2 shows the heat exchanger 3 from FIG. 1.

The invention relates to a heat exchanger arrangement 1 having at least a first heat exchanger 2 and having a second heat exchanger 3. It is also possible here for additional heat exchangers to be provided, which can be placed in a heat exchanger module, for example.

The first heat exchanger 2 has a first heat transfer matrix 4 with a first air intake surface 5 and with a first air outlet surface 6. In this design, the first air intake surface 5 is located opposite the first air outlet surface 6 with regard to the first heat transfer matrix 4. The air flows against the first heat transfer matrix 4 at the first air intake surface 5, flows through the first heat transfer matrix 4, and flows back out at the first air outlet surface 6.

The second heat exchanger 3 has a second heat transfer matrix 7 with a second air intake surface 8 and with a second air outlet surface 9. In this design, the second air intake surface 8 is located opposite the second air outlet surface 9 with regard to the second heat transfer matrix 7. The air flows against the second heat transfer matrix 7 at the second air intake surface 8, flows through the second heat transfer matrix 7, and flows back out at the second air outlet surface 9.

In this design, the first heat exchanger 2 and the second heat exchanger 3 are arranged adjacent to one another in such a manner that the first air outlet surface 6 is opposite the second air intake surface 8 and the two heat exchangers 2, 3 are arranged one behind the other in a primary direction of airflow 10. Accordingly, the air flows against the first heat exchanger 2 first, and after that against the second heat exchanger 3.

In order to seal the space between the two heat exchangers 2, 3, which is to say between the first heat transfer matrix 4 and the second heat transfer matrix 7, at least one sealing strip 13, 14 is arranged on at least one lateral side region 11, 12 of the two heat exchangers 2, 3 or on both lateral side regions 11, 12 of the heat exchangers 2, 3, which strip achieves a lateral sealing between the first heat exchanger 2 and the second heat exchanger 3.

Preferably—as is also shown in FIGS. 1 and 2—at least one sealing strip 13, 14 is arranged on both lateral side regions 11, 12 of the two heat exchangers 2, 3, which strip achieves a lateral sealing between the first heat exchanger 2 and the second heat exchanger 3.

Figure 3:
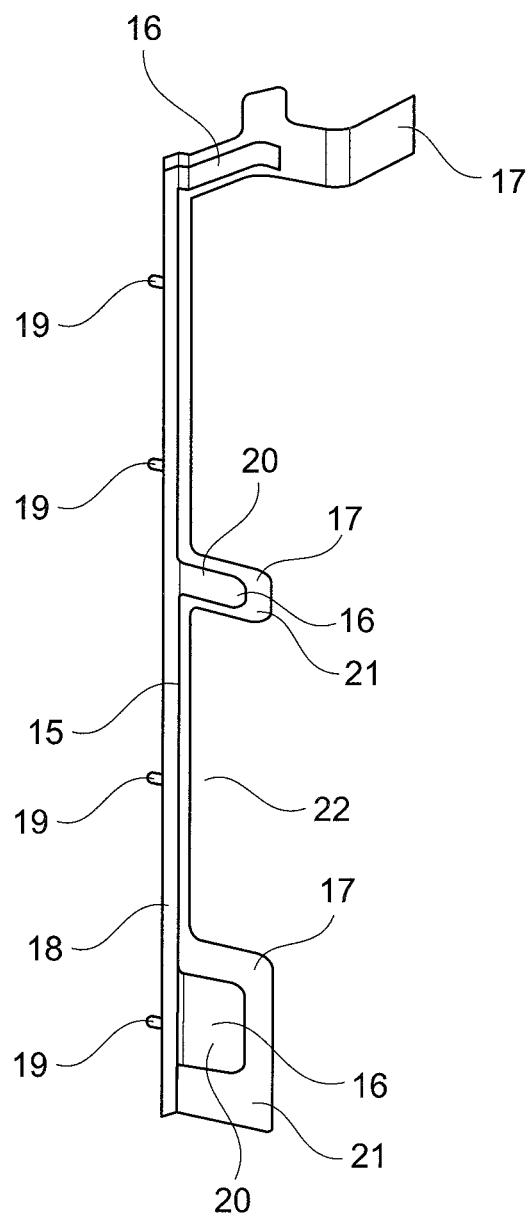
FIG. 3 is a schematic representation of a sealing strip.

It is evident from FIGS. 1, 2, and 3 that the respective sealing strip 13, 14, 15 is an injection-molded sealing strip that has an injection-molded hard component 16 on which a soft component 17 is molded.

In this design, the hard component 16 can be made of a thermoplastic material, for example of polyamide, polypropylene, etc. and/or the soft component 17 can be made of an elastomer, in particular of a thermoplastic elastomer. Advantageously, the hard component 16 can also contain, in addition to the thermoplastic material, at least one additive, for example fibers, particles, spheres, rods, etc. that are made, for example, of glass, carbon, etc. These additives increase the stability of the hard component.

FIG. 3 shows that the sealing strip 15 has a bar 18, which is made of the hard component 16, wherein the bar 18 provides for the stability of the sealing strip 15 and for the attachment of the sealing strip 15 to the at least one heat exchanger 3, 2. To this end, an attachment 19, which is used for attachment of the sealing strip 15 to the respective heat exchanger 3, 2, are provided on the bar. In FIGS. 1 and 2, the sealing strip 13, 14 is attached to the heat exchanger 3 with the bar 18. The attachment 15 can be implemented as latching elements, which can latch to a manifold, header, and/or a tube/fin block, for example.

It can be seen in FIGS. 1 to 3, and especially in FIG. 3, that at least a first tab-like element 20 made of the hard component 16 is provided on the bar 18, which element projects from the bar 18 and serves to hold the soft component 17. Provided on the bar 18 is at least a second tab-like element 21 made of the soft component 17, which projects from the bar 18 and, as appropriate, from at least one first tab-like element 20. The second tab-like element 21 is used for sealing.

Preferably at least two second tab-like elements 21 made of the soft component 17, which are spaced apart from another, are provided on the bar 18. In this case it is advantageous when a recess 22 is provided along the bar 18 between two second tab-like elements 21 for the passage of a heat exchanger, a pipe, a connecting flange, etc., as can be seen in FIG. 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger arrangement comprising:
a first heat exchanger having a first heat transfer matrix with a first air intake surface and with a first air outlet surface; and
a second heat exchanger having a second heat transfer matrix with a second air intake surface and with a second air outlet surface,
wherein the first heat exchanger and the second heat exchanger are arranged adjacent to one another such that the first air outlet surface is opposite the second air intake surface and the first and second heat exchangers are arranged one behind the other in a primary direction of airflow,
wherein at least one sealing strip is arranged on at least one lateral side region of the first and second heat exchangers or on both lateral side regions of the first and second heat exchangers, the at least one sealing strip providing a lateral sealing between the first heat exchanger and the second heat exchanger,
wherein the at least one sealing strip is an injection-molded sealing strip that has an injection-molded hard component on which a soft component is molded, and
wherein the at least one sealing strip is attached to either the first heat exchanger or the second heat exchanger and the soft component of the at least one sealing strip extends in a direction from either the first heat exchanger or the second heat exchanger, to which the at least one sealing strip is attached, towards the other of the first heat exchanger or the second heat exchanger to provide the lateral sealing between the first heat exchanger and the second heat exchanger.

2. The heat exchanger arrangement according to claim 1, wherein the at least one sealing strip is arranged on both lateral side regions of the first and second heat exchangers.

3. The heat exchanger arrangement according to claim 1, wherein the hard component is made of a thermoplastic material, a polyamide, or polypropylene, and/or wherein the soft component is made of an elastomer or a thermoplastic elastomer.

4. The heat exchanger arrangement according to claim 1, wherein the hard component is made of a thermoplastic material and at least one additive, including fibers, particles, spheres, and/or rods that are made of glass or carbon.

5. The heat exchanger arrangement according to claim 1, wherein the at least one sealing strip has a bar that is part of the hard component, wherein the bar provides for stability of the at least one sealing strip and is provided to attach the at least one sealing strip to either the first heat exchanger or the second heat exchanger.

6. The heat exchanger arrangement according to claim 5, wherein an attachment is provided on the bar to attach the at least one sealing strip to either the first heat exchanger or the second heat exchanger.

7. The heat exchanger arrangement according to claim 5, wherein at least lone first tab-like element that is part of the hard component is provided on the bar, wherein the at least one first tab-like element projects from the bar and serves to hold the soft component.

8. The heat exchanger arrangement according to claim 7, wherein at least one second tab-like element that is part of the soft component is provided on the bar, wherein the at least one second tab-like element projects from the bar and from the at least one first tab-like element, and wherein the at least one second tab-like element is used for sealing.

9. The heat exchanger arrangement according to claim 8, wherein the at least one second tab-like element includes two second tab-like elements that are part of the soft component, the two second tab-like elements being spaced apart from another and being provided on the bar.

10. The heat exchanger arrangement according to claim 9, wherein a recess is provided along the bar between the two second tab-like elements for the passage of a portion of either the first or second heat exchanger, a pipe, or a connecting flange.

11. The heat exchanger arrangement according to claim 6, wherein the attachment provided on the bar attaches directly to either the first heat exchanger or the second heat exchanger.

* * * * *